June 20, 1944. R. R. DONALDSON 2,351,745
FLOW METER
Filed June 10, 1940 2 Sheets-Sheet 2
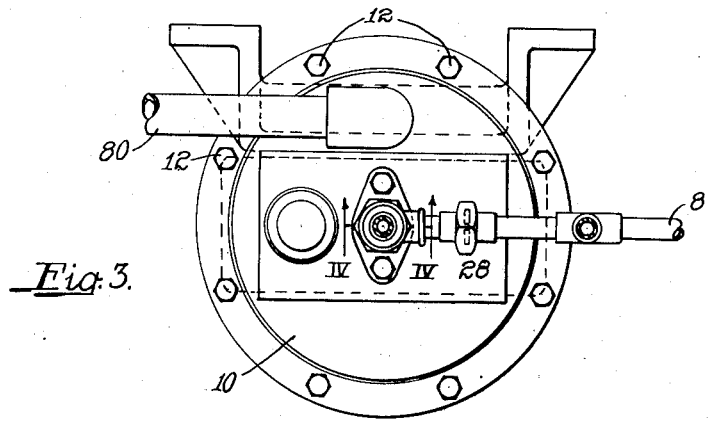
Fig. 3.
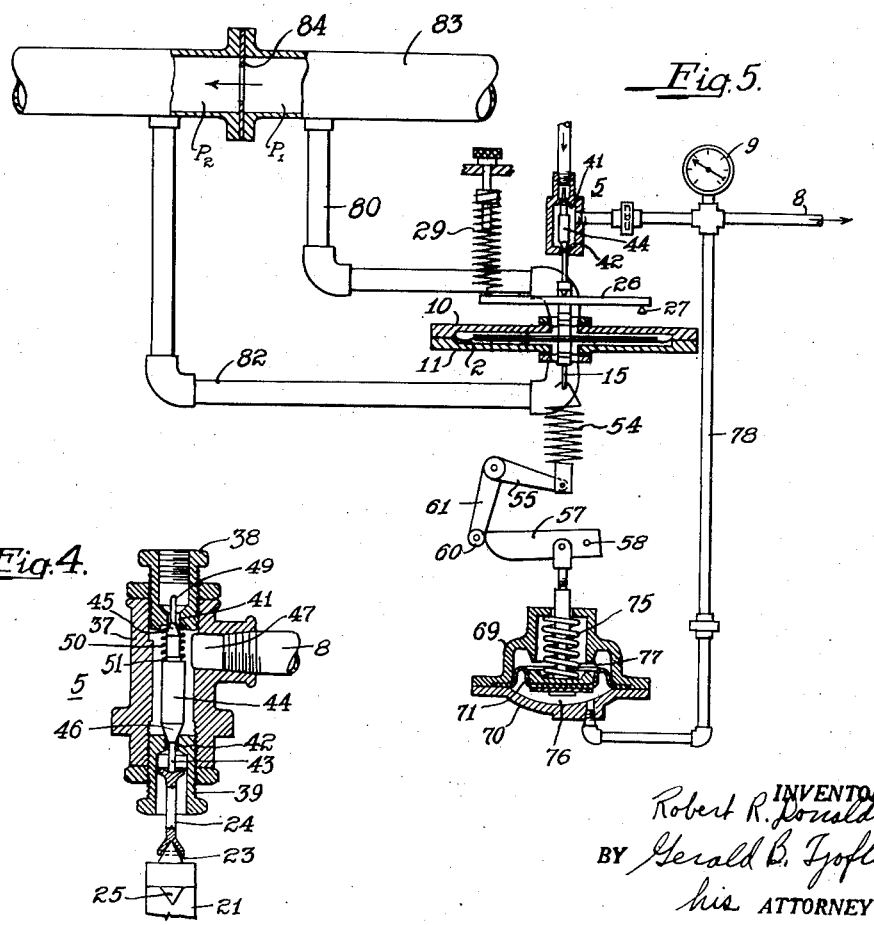
Fig. 4.
Fig. 5.
INVENTOR.
Robert R. Donaldson
BY Gerald B. Tjoflat
his ATTORNEY.

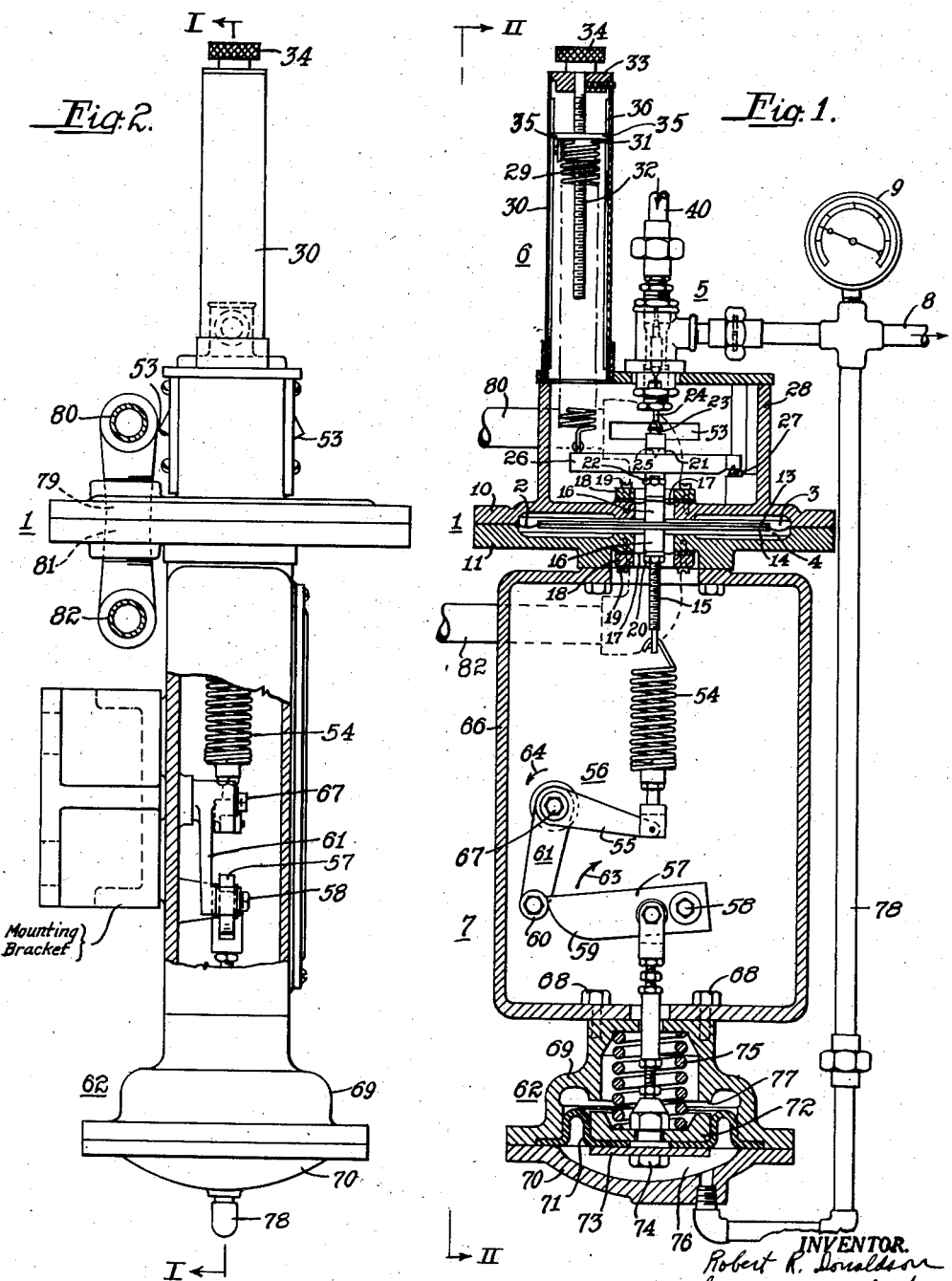

Patented June 20, 1944

2,351,745

UNITED STATES PATENT OFFICE 2,351,745

FLOWMETER

Robert R. Donaldson, Pittsburgh, Pa., assignor to John M. Hopwood, Mount Lebanon, Pa.

Application June 10, 1940, Serial No. 339,693

2 Claims. (Cl. 73—205)

This invention relates to pressure-sensitive devices, and more particularly to devices adapted to measure the pressure drop produced by the flow of a fluid or gaseous medium through an orifice and to extract the square root of the pressure differential and produce or develop a force whose magnitude is directly proportional to the flow.

An object of this invention is to provide a pressure-sensitive device that shall have means for accurately measuring the pressure drop produced across an orifice by the flow therethrough of a gaseous or fluid medium and developing a force the magnitude of which for any value of pressure drop shall be a direct measure of the flow.

A further object of the invention is to provide a flow measuring device having an element responsive to the pressure difference across an orifice produced by the flow of a gaseous or liquid medium therethrough and means for increasing the resistance to movement of the pressure difference responsive element in accordance with the square root of the pressure drop, whereby each position of the pressure difference responsive element will be a direct function of the flow producing the pressure difference across the orifice.

The above and other objects of the invention and the many uses to which it may be put will be apparent to those skilled in the art from the following description taken in conjunction with the accompanying drawings in which:

Figure 1 is a view in vertical section taken on line I—I of Fig. 2, of a flow-measuring device embodying a form of the invention, parts thereof being shown in full;

Fig. 2 is a view in side elevation and partly in section, of the device in Fig. 1, as seen looking toward it in the direction of arrows II—II;

Fig. 3 is a top plan view of the device;

Fig. 4 is an enlarged view in vertical section of an escapement valve of the device shown in Figs. 1, 2, and 3; and Fig. 5 is a more or less diagrammatic view of the device as connected to measure the flow of a liquid or gaseous medium in a pipe line or conduit.

Throughout the drawings and the specification like reference characters indicate like parts.

The device which has been chosen for the purpose of illustrating what now appears to be a preferred embodiment of the invention, comprises a housing 1 in which a pressure-sensitive element or diaphragm 2 is mounted and positioned to divide the interior of the housing into chambers 3 and 4; an escapement valve 5 operatively connected to the diaphragm; a gradient-producing means 6 that yieldingly resists movement of the diaphragm in response to increasing pressure differentials imposed on the diaphragm and means 7 operatively connected to diaphragm 2 for so modifying the gradient imposed on the diaphragm by means 6 that each position of the diaphragm is directly proportional to the square root of the pressure differential acting on the diaphragm.

Since valve 5 is actuated by diaphragm 2, the value of the pressures which it establishes in a sending line 8 will be directly proportional to the square root of the pressure differential acting on diaphragm 2. Where the device is utilized to measure flow in a pipe line, as is explained further on in connection with the description of Fig. 5, diaphragm 2 is connected across an orifice in a pipe line so as to respond to the pressure drop across it. Means 7 operates to cause the diaphragm to assume positions that are directly proportional to flow rather than pressure differential. Therefore, the pressure in pipe 8 will be proportional to flow rather than differential because the value of the pressure established in pipe 8 is directly proportional to the position of diaphragm 2.

By utilizing an indicating gauge, such as shown at 9, to measure the pressure in line 8 and by calibrating the gauge in terms of flow, each position of the gauge indicating pointer on the gauge scale will be a direct reading of the rate of flow which caused the pressure differentials to which diaphragm 2 responded.

Diaphragm housing 1 is preferably circular (see Fig. 3) and made up of upper and lower parts 10 and 11 respectively. Diaphragm 2 is mounted between these parts with the outer edge or margin thereof tightly clamped between them by means of a plurality of bolts 12. The inner portion of the diaphragm is clamped between stiff backing plates 13 and 14, so that it will not sag or buckle when external mechanical forces are applied to it.

The central portions of the diaphragm housing parts are apertured so that a through bolt 15 may be passed through diaphragm 2, backing plates 13 and 14 and project outwardly through the top and bottom of the diaphragm housing. Bushings 16 are fitted over the through bolt on each side of the diaphragm. The ends of these bushings engage sealing diaphragms 17. Diaphragms 17 are clamped to the upper and lower diaphragm housing parts 10 and 11 by means of clamping rings 18 that are secured to the diaphragm housing parts by means of screws 19. The sealing diaphragms are light and flexible, offer substantially no resistance to movement of diaphragm 2, and are used merely to seal the apertures in housing parts 10 and 11 through which through bolt 15 passes. A nut 20 is threaded onto through bolt 15 and drawn up tightly whereby the central portion of flexible diaphragm 17 which seals housing part 11 is gripped pressure tight between the nut and bushings 16.

A substantially C-shaped yoke 21 is secured at its lower end to the upper end of bolt 15 with a nut 22 so that the sealing diaphragm is gripped pressure tight between the yoke and upper bushing 16. The upper end of yoke 21 is provided with a conical or pointed lug 23 on which a link 24 is supported and operatively connected to valve 5. The lower face of the upper portion of yoke 21 is provided with a conically shaped lug 25 which bears on the top side of a beam or lever 26, one end of which is mounted on a knife edge or point bearing 27 supported on housing part 10 and the other end of which is connected to gradient means 6. Yoke 21 and lever 26 are disposed within a box-like housing 28 formed on the upper housing part 10 and this box-like housing also supports the gradient means 6 and valve 5.

Gradient-producing means 6 comprises a relatively long spring 29 which is disposed within a tubular support 30 mounted on the top of housing 28. The lower end of this spring is connected to the left-hand end of beam 26 and the upper end of the spring is secured to a traveling nut 31 which is threaded on an adjusting screw 32 which is journaled in a plug 33 mounted in and secured to the upper end of support 30. The upper end of this screw is provided with a knob 34 by which the screw may be turned to advance the nut up or down within the tubular support and thereby vary the tension in spring 29. The traveling nut is provided with lugs 35 which operate in guideways 36 formed on the inside of tubular member 30 to prevent turning of the nut when adjusting screw 32 is turned one way or the other, depending on which way the nut is to move to obtain the desired or necessary tension in the spring.

Valve 5 comprises a body 37 which is open at both ends and internally threaded to receive threaded hollow bushings 38 and 39. Bushing 38 is internally threaded at its upper end to receive a supply pipe 40 and is provided with a port 41 in its lower end through which pressure medium such as compressed air is admitted from the supply pipe to the interior of the valve body. The upper end of bushing 39 is provided with a port 42 through which pressure medium may escape from the interior of the valve body to the atmosphere. Link 24 extends into bushing 39 on which a stem 43 formed at the lower end of valve element 44 located within the valve body, rests. Valve element 44 is provided with conical or tapered surfaces 45 and 46 at its opposite ends that cooperate with and control the rate of flow of air through ports 41 and 42, respectively. The valve body is provided with an outlet port 47 that communicates with the interior of the valve body and this port is connected to the sending line or pipe 8.

The upper end of valve element 44 is provided with a stem or extension 49 that extends through the inlet port and serves to guide and position the valve element. A light compression spring 50 is disposed between the lower end of bushing 38 and a shoulder 51 formed on valve element 44 which tends to urge the valve element toward exhaust port 42.

Since bushings 38 and 39 are threaded into the opposite ends of the valve body they may be adjusted to predetermine the distance between the inlet port and the exhaust port and thereby fix the overall travel required of valve element 44 either to close the inlet port entirely and open the outlet port or vice versa.

When valve element 44 is in its uppermost position and closes inlet port 41, any pressure in the sending line 8 and valve body 37 will exhaust through exhaust port 42 to the atmosphere. Of course, the air first discharges into the box-like housing 28 from which it exhausts to the atmosphere through suitable openings 53 in the sides of the housing. When the pressure medium has exhausted to the atmosphere, the pressure within the valve body and in the sending line will be at the minimum value. If valve element 44 is actuated to the other limit of its travel, that is to the position where the exhaust port is completely closed and inlet port 41 is wide open, the pressure established within the valve body and within the sending line will be at the maximum value of pressure in the supply pipe 40. If valve element 44 is positioned at some intermediate point, the pressure within the valve body and in sending line 8 will be proportional to the position of the throttling surfaces 45 and 46 of the valve element relative to the inlet and exhaust ports 41 and 42. Thus by positioning valve element 44 at any point between its maximum limits the pressure delivered to the valve body and to the sending line 8 may be varied infinitesimally from minimum to the maximum or vice versa.

The amount of travel of valve element 44 required either to close fully the inlet port or to close fully the exhaust port is relatively small and is of the order of one to two thousandths of an inch. Therefore, it will be apparent that diaphragm 2 will move only one to two thousandths of an inch to actuate valve element 44 throughout its full stroke.

Means 7 comprises a spring 54 which is connected at its upper end to the lower end of bolt 15 and at its lower end to an arm 55 of a bell crank 56, a lever 57 which is pivotably supported at one end on a stub shaft 58 and formed with a curved surface 59 at its other end disposed to engage a roller 60 journaled at the end of an arm 61 of the bell crank, and a pressure-actuating device 62 for turning lever 57 on its shaft 58. If the pressure-actuating device causes lever 57 to turn in the direction of arrow 63 it will be apparent that the bell crank will turn in the direction of arrow 64, that is in a counterclockwise direction and will relieve or decrease the tension in spring 54 in accordance with the shape of the curve of surface 59. If this surface is made proportional to the square root of the pressure drop or differential to which diaphragm 2 responds, then the tension in spring 54 will vary with the square root of the pressure drop across the diaphragm because, as it will be later explained, lever 57 is positioned directly in accordance with the pressure sent out by valve 5 through sending line 8.

Spring 54, bell crank 56, and lever 57 are disposed within a housing 66 on which the diaphragm housing 1 is also supported. The bell crank is mounted on a stub shaft 67 which is threaded into the back of the housing. Likewise, stub shaft 58 is also threaded into the back wall of the housing.

Pressure-actuating device 62 is supported from the under side of the housing 66 by means of screws 68. Device 62 comprises a two-part housing including a body 69 and a cap 70. A diaphragm 71 extends across the chamber within the housing and is clamped at its outer edge between the body and the cap. The central portion of the diaphragm is clamped between a flanged plate 72 and a backing plate 73 disposed on opposite sides of the diaphragm and secured tightly together by means of a bolt 74. The diaphragm is urged downwardly by means of a compression spring 75 positioned as shown in Fig. 1. This spring has its lower end nested within the flange of plate 72 and its upper end bearing against the upper end of housing body 69.

In Figs. 1 and 5 the diaphragm is shown in its lowermost position. Therefore, it will be apparent that the tension of spring 75 is such that it has sufficient power to turn bell crank 56 to the position shown and impose maximum tension in spring 54. This maximum tension occurs when the pressure in chamber 76 of the diaphragm housing is at its minimum value. The upper limit of movement of diaphragm 71 is limited by a flange 77 formed on the interior of housing body 69. Therefore, as may be seen in the drawings, the maximum upward movement of the diaphragm is represented by the space between the top of the flange of plate 72 and flange 77.

The characteristic stiffness of spring 75 is such that when the pressure within chamber 76 is increased from its minimum value to its maximum value, the spring will be compressed only the distance through which the diaphragm may move.

Chamber 76 is supplied with pressure by the sending line 8 through a pipe 78 leading to the interior of chamber 76. If it be assumed that the maximum pressure that can be established in line 8 is, say sixty pounds per square inch, then the maximum pressure that will be established in chamber 76 will also be sixty pounds per square inch. The area of the diaphragm is such that the diaphragm will make its full travel against the opposing force of spring 75.

If the flow-responsive device is to be utilized to translate the pressure drop across an orifice produced by the flow through it of a gaseous or liquid medium fluid, into an impulse whose magnitude shall be equal to $k(P_1-P_2)^{1/2}$ (the flow though an orifice is equal to $k\sqrt{P_1-P_2}$ where $k$ is a proportionality constant and $P_1$ is the pressure on the upstream side of the orifice and the $P_2$ is the pressure on the downstream side) the shape of curved surface 59 of cam bar or lever 57 is made to correspond to the equation $$y=k(x)^{1/2} \text{ or } y=k\sqrt{x}$$

Before the device is placed in operation, bushings 38 and 39 of valve 5 are adjusted for the travel or maximum movement of element 44 during normal operation. Then with no pressure difference acting on the diaphragm, which would correspond to zero flow, spring 29 is adjusted until the pressure in sending line 8 and in chamber 76 is zero gauge pressure. When this condition is established cam lever 57 will be in its lowermost position and the maximum tension will be imposed on spring 54 but the net pull of springs 54 and 29 on diaphragm 2 will be zero. In other words the pull of springs 54 and 29 on diaphragm 2 will be equal and opposite.

When the device is connected to a pipe line across an orifice to measure flow, the upper side of diaphragm 2 will be exposed to the pressure on the upstream side of the orifice and the lower side of the diaphragm to the pressure on the downstream side. In order that the upper side of diaphragm 2 may be exposed to pressure, upper housing part 10 is provided with a tapped opening 79 to accommodate a pipe 80 which is threaded into the opening. This pipe is connected to the flow pipe on the upstream side of the orifice. The lower diaphragm housing part 11 is provided with a tapped opening 81 into which a pipe 82 is threaded and this pipe is connected to the flow pipe at a point on the downstream side of the orifice. The connections of the upper and lower diaphragm chambers to the upstream and downstream sides of an orifice in a flow pipe are shown in Fig. 5, and the operation of my device will be readily understood from this view.

In Fig. 5 a pipe 83 is shown through which a gaseous or liquid medium flows and which is provided with an orifice 84 which produces a pressure drop that varies with the flow. Pipe 80 of the flow-responsive device is connected to the upstream side of the orifice and pipe 82 is connected to the downstream side of the orifice. Thus, the upper side of diaphragm 2 is exposed to a pressure $P_1$ and the lower side thereof is subjected to a pressure $P_2$, pressure $P_2$ being less than pressure $P_1$ whenever there is a flow in the pipe line.

If we assume that from a condition of zero flow, and flow commences and produces a pressure difference $P_1-P_2$, diaphragm 2 will deflect downwardly and move valve element 44 away from its inlet port 41 and allow air or pressure medium to flow into valve body 37, sending pipe 8 and chamber 76 of actuating device 62. The pressure in chamber 76 causes diaphragm 71 to move upwardly whereby lever 57 is turned in a clockwise direction an amount proportional to the pressure introduced into chamber 76, thereby causing bell crank 56 to turn counter-clockwise or in the direction of arrow 64. The tension in spring 54 and the value of the force it exerts in opposition to spring 29 are both reduced so that spring 29 will be effective to exert a greater upward pull or force on diaphragm 2. Diaphragm 2 will then move upward slightly until the total force of the pressure difference $(P_1-P_2)$ and the downward force of spring 54 on diaphragm 2 balance the upward force of spring 29. When this occurs the pressure in pipe 8 will be proportional to $\sqrt{P_1-P_2}$ and be a direct measure of the particular rate of flow which produced the pressure differential $(P_1-P_2)$.

As the flow in pipe 83 increases to greater and greater values, the difference between the pressure difference $(P_1-P_2)$ will likewise increase. Therefore the force tending to push diaphragm 2 downwardly will increase as this pressure difference increases. With each additional downward movement of diaphragm 2, that is for each new position that diaphragm 2 assumes in the downward direction, there will be a new and different higher pressure established in chamber 76 of actuator 62 so that cam bar 57 will come to a different position in the direction of travel of arrow 63 for each new value of $(P_1-P_2)$. This will result in a different value of tension in spring 54 for each value of $(P_1-P_2)$. That is, for each position of cam bar 57 as it moves in the direction of arrow 63 the tension of spring 54 will be diminished in accordance with the equation $y=k\sqrt{x}$. Since the curve of cam surface 59 is such that it will modify the characteristic or gradient of spring 29, spring 29 will resist downward movement of the diaphragm 2 in accordance with $\sqrt{P_1-P_2}$. Therefore each position of diaphragm 2, instead of being proportional to the pressure drop $(P_1-P_2)$ will be proportional to the square root of this pressure drop or to $\sqrt{P_1-P_2}$. Since this is so, it follows that the pressure in pipe 8, the sending pipe, will be proportional to the position of diaphragm 2 and therefore proportional to $\sqrt{P_1-P_2}$.

The above-described action will continue with increasing flows until the maximum flow that the device can measure has been reached. When the flows decrease the device operates exactly in the reverse of the description of the operation described above.

From the above, it will be seen that by shaping surface 59 of cam bar to correspond to the equation $y=\sqrt{x}$ or $y=k\sqrt{x}$ that the pressure impulse sent out through pipe 8 by valve 5 will be proportional to the square root of the pressure drop acting on diaphragm 2. From this it will be apparent that the shape of cam surface 59 will determine the relationship between the pressure in pipe 8 to the pressure drop acting on diaphragm 2. Thus, for example by shaping cam surface 59 in accordance with the equation $y=x^n$, $n$ may be made greater or less than unity and a pressure in the sending pipe 8 may be produced that is proportional to $(P_1-P_2)^n$ and that $n$ may be either greater than one or less than unity.

Having thus described the principles of the invention and having illustrated and described a preferred embodiment thereof, it will be apparent that various modifications and changes may be made in the invention without departing either from the spirit or the scope thereof.

Therefore, what I claim as new and desire to secure by Letters Patent is:

1. A pressure-responsive device adapted to respond to a pressure difference $(P_1-P_2)$ and to establish another pressure whose value is proportional to the $(n\text{th})$ power of $(P_1-P_2)$ where the value of "$n$" may be greater or less than unity, said device comprising a housing having a pressure-sensitive member therein, said housing having means whereby one side of the sensitive member may be subjected to one pressure and the other side thereof may be subjected to another pressure, a spring connected to oppose movement of said pressure-sensitive member in response to increasing values of $(P_1-P_2)$ and having a positive gradient characteristic, valve means actuated by said pressure-sensitive member adapted to deliver a pressure medium to a pressure sending line and to cause the value of pressure to vary with the position of the valve as determined by the deflection of the pressure-sensitive member, and means for varying the force exerted by said opposing spring comprising a spring connected to said pressure-sensitive member and exerting a force opposing the force of the first mentioned spring, and means for decreasing the tension in said second mentioned spring in accordance with the $(n\text{th})$ power of $(P_1-P_2)$.

2. A pressure-responsive device adapted to respond to a pressure difference $(P_1-P_2)$ and to establish another pressure whose value is proportional to the $(n\text{th})$ power of $(P_1-P_2)$ where the value of "$n$" may be greater or less than unity, said device comprising a housing having a pressure-sensitive member therein, said housing having means whereby one side of the sensitive member may be subjected to one pressure and the other side thereof may be subjected to another pressure, a spring connected to oppose movement of said pressure-sensitive member in response to increasing values of $(P_1-P_2)$ and having a positive gradient characteristic, valve means actuated by said pressure-sensitive member adapted to deliver a pressure medium to a pressure sending line and to cause the value of pressure to vary with the position of the valve as determined by the deflection of the pressure-sensitive member, and means for modifying the effective force exerted by said opposing spring comprising a movable support, a spring having one end connected to said pressure-sensitive member in opposing relation to said first mentioned spring and the other end connected to said movable support whereby as the support is moved the tension in said spring is varied, a cam for moving said support, and a pressure-actuated member responsive to the sending pressure for moving the cam, the surface of the cam having a curve whose ordinates are proportional to the $(n\text{th})$ power of $(P_1-P_2)$, the cam being so mounted that the force exerted by the spring connected to the movable support is varied inversely in accordance with the changes in $(P_1-P_2)$.

ROBERT R. DONALDSON.